United States Patent
Tran et al.

(10) Patent No.: US 10,841,603 B2
(45) Date of Patent: *Nov. 17, 2020

(54) SYSTEMS AND METHODS FOR EMBEDDING CONTENT INTO VIDEOS

(71) Applicant: GoPro, Inc., San Mateo, CA (US)

(72) Inventors: Peter Tran, San Diego, CA (US); Douglas D. Melton, Carlsbad, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/722,959

(22) Filed: Dec. 20, 2019

(65) Prior Publication Data

US 2020/0128267 A1    Apr. 23, 2020

Related U.S. Application Data

(63) Continuation of application No. 15/793,565, filed on Oct. 25, 2017, now Pat. No. 10,542,272.

(51) Int. Cl.
*H04N 19/463*    (2014.01)
*H04N 21/2389*   (2011.01)
*G06F 16/44*     (2019.01)
*G06F 16/783*    (2019.01)

(52) U.S. Cl.
CPC .......... *H04N 19/463* (2014.11); *G06F 16/44* (2019.01); *G06F 16/7837* (2019.01); *H04N 21/23892* (2013.01)

(58) Field of Classification Search
None
See application file for complete search history.

(56) References Cited

U.S. PATENT DOCUMENTS

2017/0213389 A1*  7/2017  Han ................... H04N 5/44591
2019/0191203 A1*  6/2019  Asbun ................ H04N 21/2668

* cited by examiner

*Primary Examiner* — James M Anderson II
(74) *Attorney, Agent, or Firm* — Esplin & Associates, PC (57) ABSTRACT

Video information, visual information, and rendering instructions may be obtained. The video information may define spherical video content having a progress length. The spherical video content may define visual content viewable from a point of view as a function of progress through the spherical video content. The visual information may define additional visual content to be presented with the spherical video content. The rendering instructions may define how the additional visual content is to be presented with the spherical video content during playback. Container information defining a container file may be generated. The container information may include the video information, the visual information, and the rendering instructions within a structure corresponding to a type of the container file. A playback of the spherical video content using the container file may include a presentation of the additional visual content with the spherical video content based on the rendering instructions.

20 Claims, 7 Drawing Sheets

SYSTEMS AND METHODS FOR EMBEDDING CONTENT INTO VIDEOS

FIELD

This disclosure relates to embedding content into a video by packaging the video with the content and rendering instructions.

BACKGROUND

It may be desirable to present additional content with video content during playback. Encoding the additional content into the video content may result in inflexible/undesirable viewing experience. For example, video content may include a spherical view of a scene and encoding the additional content to a particular visual extent of the video content (e.g., statically drawing an image into a portion of the spherical image space of spherical video content) may result in the additional content not being viewed by users during playback (e.g., based on the viewing windows not including the additional content, based on the users' gaze not being directed towards the additional content).

SUMMARY

Video information, visual information, rendering instructions, and/or other information may be obtained. The video information may define spherical video content having a progress length. The spherical video content may define visual content viewable from a point of view as a function of progress through the spherical video content. The visual information may define additional visual content to be presented with the spherical video content. The rendering instructions may define how the additional visual content is to be presented with the spherical video content during playback. Container information defining a container file may be generated. The container information may include the video information, the visual information, the rendering instructions, and/or other information within a structure corresponding to a type of the container file. A playback of the spherical video content using the container file may include a presentation of the additional visual content with the spherical video content based on the rendering instructions. The container information may be stored in one or more storage media.

A system that embeds content into videos may include one or more electronic storage, processor and/or other components. The electronic storage may store video information defining video content, visual information defining additional visual content, rendering instructions, and/or other information. Video content may refer to media content that may be consumed as one or more videos. Video content may include one or more videos stored in one or more formats/containers, and/or other video content. The video content may have a progress length. The video content may define visual content viewable as a function of progress through the video content. The video content may include spherical video content and/or other video content. Spherical video content may define visual content viewable from a point of view as a function of progress through the spherical video content. In some implementations, the video content (e.g., spherical video content) may be consumed as virtual reality content.

Additional visual content may refer to visual content to be presented with the video content. For example, additional visual content may refer to visual content to be presented with spherical video content. Additional visual content may include image content (e.g., one or more images), video content (e.g., one or more videos), and/or other visual content. In some implementations, the additional visual content may include a bumper for the video content (e.g., spherical video content).

Rendering instructions may define how the additional visual content is to be presented with the video content during playback. Rendering instructions may include one or more preset rendering instructions (e.g., rendering options selected by a user), one or more custom rendering instructions (e.g., rendering options customized by a user), and/or other rendering instructions.

In some implementations, the rendering instructions may include one or more instructions to present the additional visual content at a beginning of the progress length of the video content. In some implementations, the rendering instructions may include one or more instructions to present the additional visual content at an end of the progress length of the video content.

In some implementations, the rendering instructions may include a first instruction to present the additional visual content at a presentation direction. In some implementations, the rendering instructions may include a second instruction to present the additional visual content at a presentation extent.

In some implementations, the rendering instructions may include one or more instructions to present the additional visual content based on a viewing window for the video content (e.g., spherical video content). The viewing window may define an extent of the visual content of the video content presented during playback as the function of progress through the video content.

The processor(s) may be configured by machine-readable instructions. Executing the machine-readable instructions may cause the processor(s) to facilitate embedding content into videos. The machine-readable instructions may include one or more computer program components. The computer program components may include one or more of a video information component, a visual information component, a rendering instructions component, a container component, a storage component, and/or other computer program components.

The video information component may be configured to obtain video information defining one or more video content (e.g., spherical video content) and/or other information. The video information component may obtain video information from one or more locations. The video information component may obtain video information during acquisition of the video content and/or after acquisition of the video content by one or more image sensors/image capture devices.

The visual information component may be configured to obtain visual information defining one or more additional visual content to be presented with the video content and/or other information. The visual information component may obtain visual information from one or more locations. The video information component may obtain visual information during acquisition of the additional visual content and/or after acquisition of the additional visual content by one or more image sensors/image capture devices.

The rendering instructions component may be configured to obtain rendering instruction and/or other information. The rendering instructions component may obtain rendering instructions from one or more locations. The rendering instructions component may obtain rendering instructions from one or more hardware and/or one or more software that enables a user to choose one or more rendering instructions and/or one or more options for determining rendering instructions.

The container component may be configured to generate container information defining a container file and/or other information. The container information may include the video information, the visual information, the rendering instructions, and/or other information within a structure corresponding to a type of the container file. In some implementations, the visual information and the rendering information may be stored as metadata in the container file. A playback of the video content using the container file may include a presentation of the additional visual content with the video content based on the rendering instructions.

The storage component may be configured to effectuate storage of the container information and/or other information in one or more storage media. The storage component may effectuate storage of the container information and/or other information in one or more locations including the video information, the visual information, and/or the rendering instructions and/or other locations.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
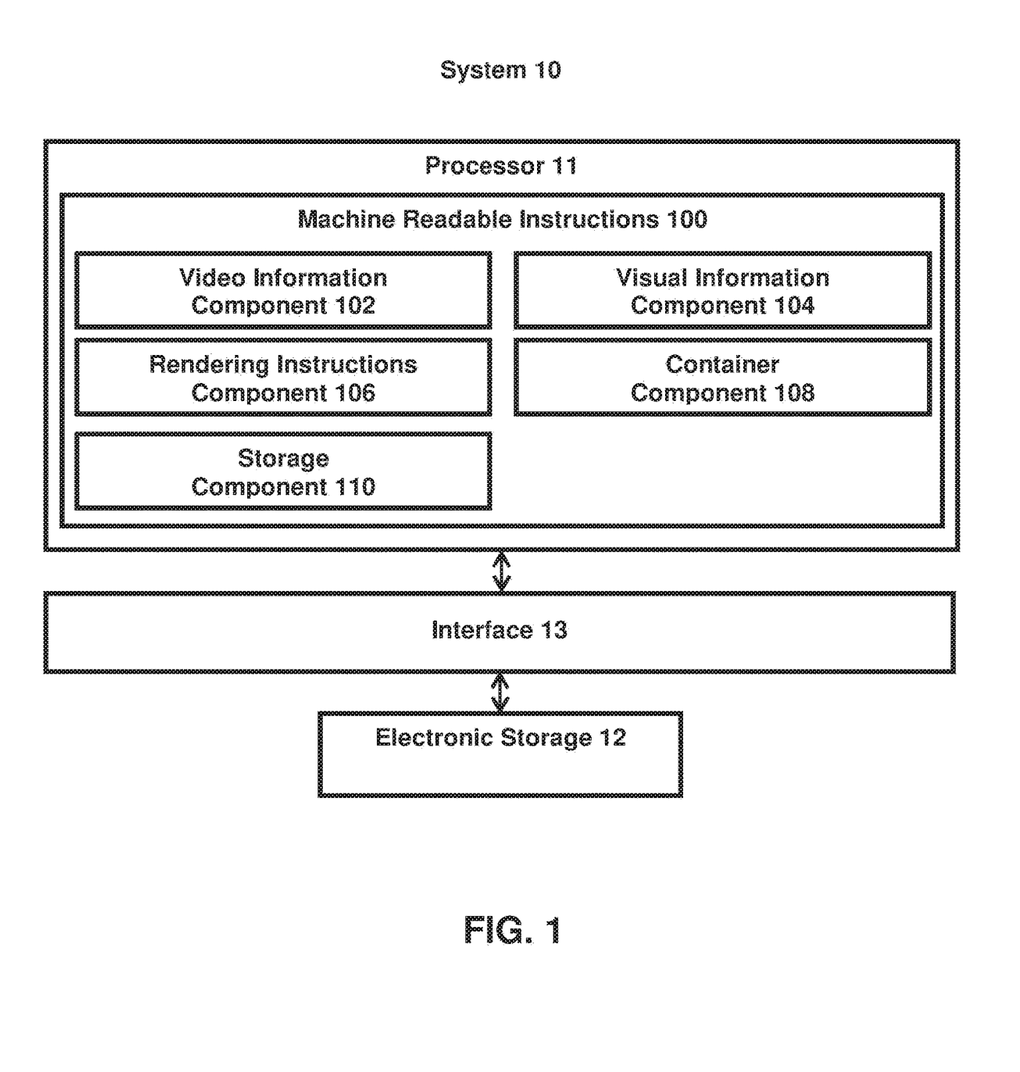
FIG. 1 illustrates a system that embeds content into videos.

FIG. 1 illustrates a system 10 for embedding content into videos. The system 10 may include one or more of a processor 11, an electronic storage 12, an interface 13 (e.g., bus, wireless interface), and/or other components. Video information, visual information, rendering instructions, and/or other information may be obtained by the processor 11. The video information may define spherical video content having a progress length. The spherical video content may define visual content viewable from a point of view as a function of progress through the spherical video content. The visual information may define additional visual content to be presented with the spherical video content. The rendering instructions may define how the additional visual content is to be presented with the spherical video content during playback. Container information defining a container file may be generated by the processor 11. The container information may include the video information, the visual information, the rendering instructions, and/or other information within a structure corresponding to a type of the container file. A playback of the spherical video content using the container file may include a presentation of the additional visual content with the spherical video content based on the rendering instructions. The container information may be stored in one or more storage media.

The electronic storage 12 may be configured to include electronic storage medium that electronically stores information. The electronic storage 12 may store software algorithms, information determined by the processor 11, information received remotely, and/or other information that enables the system 10 to function properly. For example, the electronic storage 12 may store information relating to video information, visual information, rendering instructions, container information, and/or other information.

For example, the electronic storage 12 may store video information defining one or more video content, visual information defining additional visual content, rendering instructions, and/or other information. Video content may refer to media content that may be consumed as one or more videos. Video content may include one or more videos stored in one or more formats/containers, and/or other video content. A format may refer to one or more ways in which the information defining video content is arranged/laid out (e.g., file format). A container may refer to one or more ways in which information defining video content is arranged/laid out in association with other information (e.g., wrapper format). A video may include a video clip captured by a video capture device, multiple video clips captured by a video capture device, and/or multiple video clips captured by different video capture devices. A video may include multiple video clips captured at the same time and/or multiple video clips captured at different times. A video may include a video clip processed by a video application, multiple video clips processed by a video application and/or multiple video clips processed by different video applications.

Video content may have a progress length. A progress length may be defined in terms of time durations and/or frame numbers. For example, video content may include a video having a time duration of 60 seconds. Video content may include a video having 1800 video frames. Video content having 1800 video frames may have a play time duration of 60 seconds when viewed at 30 frames/second. Other time durations and frame numbers are contemplated.

Video content may define visual content viewable as a function of progress through the video content. In some implementations, video content may include one or more of spherical video content, virtual reality content, and/or other video content. Spherical video content and/or virtual reality content may define visual content viewable from a point of view as a function of progress through the spherical video/virtual reality content.

Spherical video content may refer to a video capture of multiple views from a location. Spherical video content may include a full spherical video capture (360 degrees of capture, including opposite poles) or a partial spherical video capture (less than 360 degrees of capture). Spherical video content may be captured through the use of one or more cameras/image sensors to capture images/videos from a location. For example, multiple images/videos captured by multiple cameras/image sensors may be stitched together to form the spherical video content. The field of view of cameras/image sensor(s) may be moved/rotated (e.g., via movement/rotation of optical element(s), such as lens, of the image sensor(s)) to capture multiple images/videos from a location, which may be stitched together to form the spherical video content. In some implementations, spherical video content may be stored with a 5.2K resolution. Using a 5.2K spherical video content may enable viewing windows for the spherical video content with resolution close to 1080p. In some implementations, spherical video content may include 12-bit video frames. In some implementations, spherical video content may be consumed as virtual reality content.

Virtual reality content may refer to content (e.g., spherical video content) that may be consumed via virtual reality experience. Virtual reality content may associate different directions within the virtual reality content with different viewing directions, and a user may view a particular directions within the virtual reality content by looking in a particular direction. For example, a user may use a virtual reality headset to change the user's direction of view. The user's direction of view may correspond to a particular direction of view within the virtual reality content. For example, a forward looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

Figure 3:
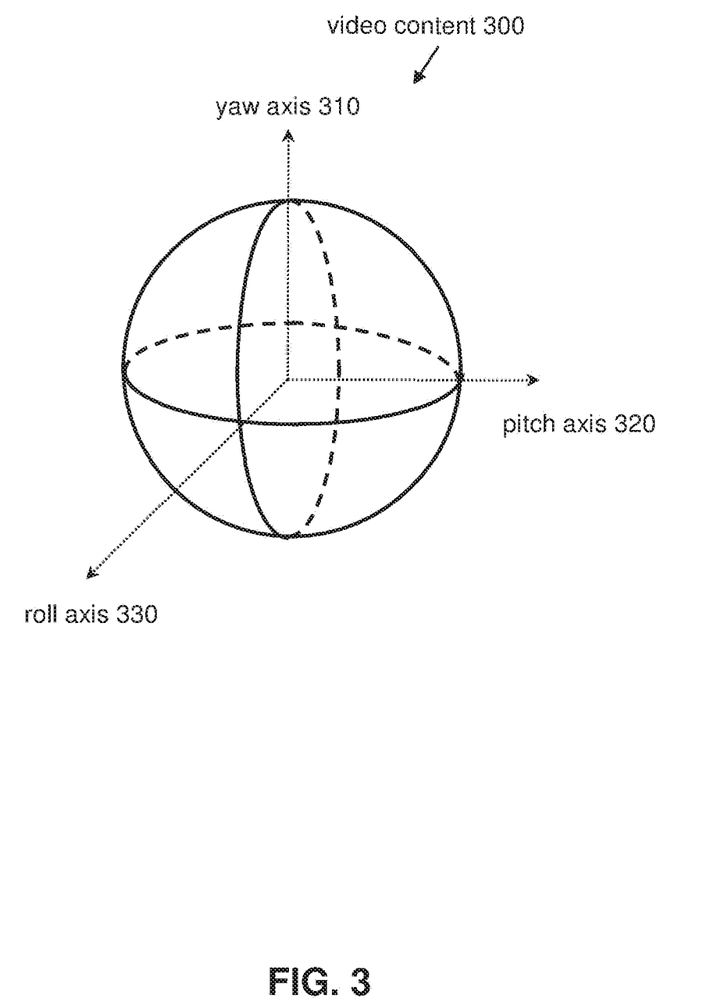
FIG. 3 illustrates an example spherical video content.

FIG. 3 illustrates an example video content 300 defined by video information. The video content 300 may include spherical video content. The video content 300 may define visual content viewable from a point of view (e.g., center of sphere) as a function of progress through the video content 300. FIG. 3 illustrates example rotational axes for the video content 300. Rotational axes for the video content 300 may include a yaw axis 310, a pitch axis 320, a roll axis 330, and/or other axes. Rotations about one or more of the yaw axis 310, the pitch axis 320, the roll axis 330, and/or other axes may define viewing directions/viewing window for the video content 300.

For example, a 0-degree rotation of the video content 300 around the yaw axis 310 may correspond to a front viewing direction. A 90-degree rotation of the video content 300 around the yaw axis 310 may correspond to a right viewing direction. A 180-degree rotation of the video content 300 around the yaw axis 310 may correspond to a back viewing direction. A −90-degree rotation of the video content 300 around the yaw axis 310 may correspond to a left viewing direction.

A 0-degree rotation of the video content 300 around the pitch axis 320 may correspond to a viewing direction that is level with respect to horizon. A 45-degree rotation of the video content 300 around the pitch axis 320 may correspond to a viewing direction that is pitched up with respect to horizon by 45-degrees. A 90 degree rotation of the video content 300 around the pitch axis 320 may correspond to a viewing direction that is pitched up with respect to horizon by 90-degrees (looking up). A −45-degree rotation of the video content 300 around the pitch axis 320 may correspond to a viewing direction that is pitched down with respect to horizon by 45-degrees. A −90 degree rotation of the video content 300 around the pitch axis 320 may correspond to a viewing direction that is pitched down with respect to horizon by 90-degrees (looking down).

A 0-degree rotation of the video content 300 around the roll axis 330 may correspond to a viewing direction that is upright. A 90 degree rotation of the video content 300 around the roll axis 330 may correspond to a viewing direction that is rotated to the right by 90 degrees. A −90-degree rotation of the video content 300 around the roll axis 330 may correspond to a viewing direction that is rotated to the left by 90-degrees. Other rotations and viewing directions are contemplated.

A playback of video content (e.g., the video content 300) may include presentation of one or more portions of the video content on one or more displays based on a viewing window and/or other information. The viewing window may define extents of the visual content viewable as the function of progress through the video content. The viewing window may define extents of the visual content presented on the display(s) as the function of progress through the video content. For spherical video content, the viewing window may define extents of the visual content viewable from the point of view as the function of progress through the spherical video content.

The viewing window may be characterized by a viewing direction, viewing size (e.g., zoom), and/or other information. A viewing direction may define a direction of view for video content. A viewing direction may define the angle/portion of the video content at which the viewing window is directed. A viewing direction may define a direction of view for the video content selected by a user and/or defined by instructions for viewing the video content as a function of progress through the video content (e.g., director track specifying viewing direction as a function of progress through the video content). For spherical video content, a viewing direction may define a direction of view from the point of view from which the visual content is defined. Viewing directions for the video content may be characterized by rotations around the yaw axis 310, the pitch axis 320, the roll axis 330, and/or other axes. For example, a viewing direction of a 0-degree rotation of the video content around a yaw axis (e.g., the yaw axis 310) and a 0-degree rotation of the video content around a pitch axis (e.g., the pitch axis 320) may correspond to a front viewing direction (the viewing window is directed to a forward portion of the visual content captured within the spherical video content).

Figure 4:
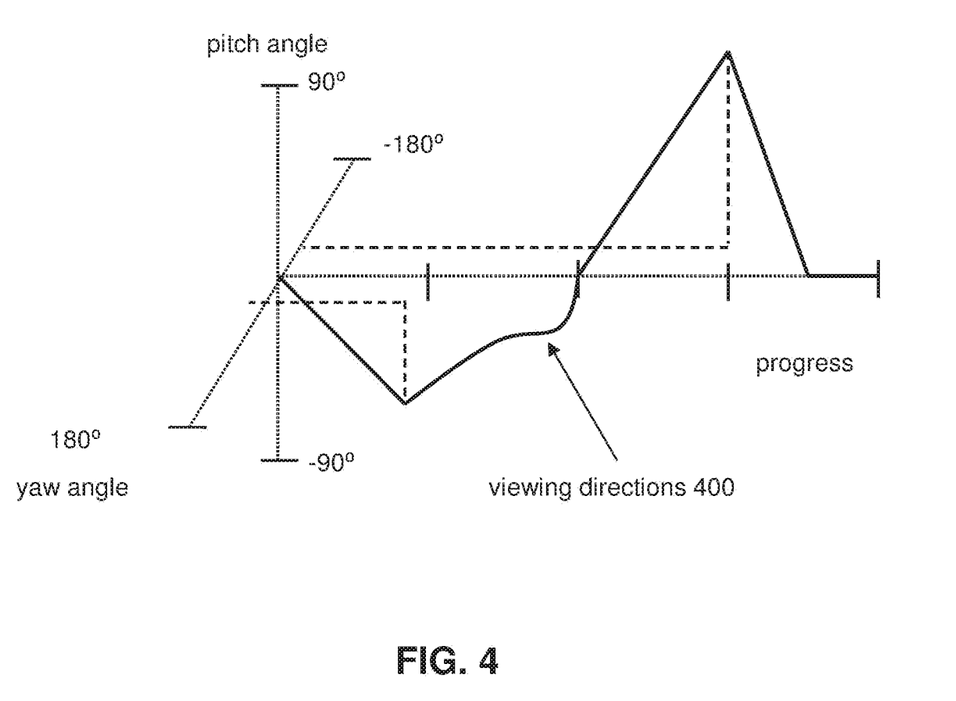
FIG. 4 illustrates example viewing directions for spherical video content.

For example, FIG. 4 illustrates example changes in viewing directions 400 (e.g., selected by a user for video content, specified by a director's track) as a function of progress through the video content. The viewing directions 400 may change as a function of progress through the video content. For example, at 0% progress mark, the viewing directions 400 may correspond to a zero-degree yaw angle and a zero-degree pitch angle. At 25% progress mark, the viewing directions 400 may correspond to a positive yaw angle and a negative pitch angle. At 50% progress mark, the viewing directions 400 may correspond to a zero-degree yaw angle and a zero-degree pitch angle. At 75% progress mark, the viewing directions 400 may correspond to a negative yaw angle and a positive pitch angle. At 87.5% progress mark, the viewing directions 400 may correspond to a zero-degree yaw angle and a zero-degree pitch angle. Other viewing directions are contemplated.

Figure 5A:
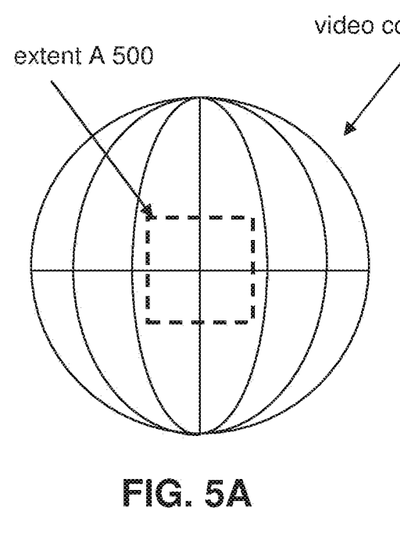
FIGS. 5A-5B illustrate example extents of spherical video content.
Figure 5B:
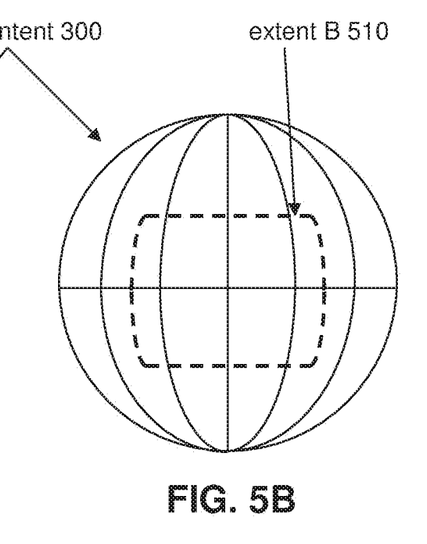

A viewing size may define a size (e.g., zoom, viewing angle) of viewable extents of visual content within the video content. A viewing size may define the dimensions of the viewing window. A viewing size may define a size of viewable extents of visual content within the video content selected by a user and/or defined by instructions for viewing the video content as a function of progress through the video content (e.g., director track specifying viewing size as a function of progress through the video content). FIGS. 5A-5B illustrate examples of extents for the video content 300. In FIG. 5A, the size of the viewable extent of the video content 300 may correspond to the size of extent A 500. In FIG. 5B, the size of viewable extent of the video content 300 may correspond to the size of extent B 510. Viewable extent of the video content 300 in FIG. 5A may be smaller than viewable extent of the video content 300 in FIG. 5B. Other viewing sizes are contemplated.

In some implementations, a viewing size may define different shapes of viewable extents. For example, a viewing window may be shaped as a rectangle, a triangle, a circle, and/or other shapes. In some implementations, a viewing size may define different rotations of the viewing window (viewing rotation). A viewing size may change based on a rotation of viewing. For example, a viewing size shaped as a rectangle may change the orientation of the rectangle based on whether a view of the video content includes a landscape view or a portrait view. Other rotations of a viewing window are contemplated.

Additional visual content may refer to visual content to be presented with the video content. Additional visual content may include image content (e.g., one or more images), video content (e.g., one or more videos), and/or other visual content. Additional visual content may include static visual content (e.g., not changing with playback time/position) and/or dynamic visual content (e.g., changing with playback time/position). In some implementations, additional visual content may be accompanied by/associated with additional audio content (e.g., sounds, songs, words) to be played during playback of the video content. Audio content may refer to media content that may be consumed as one or more sounds. Additional audio content may include recorded sounds, computer-generated sounds, processed sounds, and/or other sounds.

Additional visual content may be presented with the video content during playback. For example, additional visual content may refer to visual content to be presented with spherical video content. Presentation of the additional visual content with the video content may include presentation of the additional visual content on top of the video content (presented as overlay over the visual content of the video content), presentation of the additional visual content in place of one or more portions (in space or time) of the video content, presentation of the additional visual content adjacent/next to (in space and/or time) the video content, and/or other presentation of the additional visual content with the video content.

For example, the additional visual content may include one or more bumpers for the video content (e.g., spherical video content). A bumper may refer to one or more (additional) video frames to be played before the main video content. For example, a bumper may include a short video/animation to be played as intro and/or outro for the video content. The bumper may include video frames from the video content (e.g., copies and/or manipulations of the video frames of the video content) and/or video frames not from the video content (e.g., video frames created separately from/independent of the video content). Other types of additional visual content are contemplated.

Rendering instructions may define how the additional visual content is to be presented with the video content during playback. Rendering instructions may define how the additional visual content should appear with respect to the video content in terms of time (progress length of the video content) and/or space (location/rotation with respect to the image space of the video content).

Rendering instructions may define where in the progress length of the video content the additional visual content should be presented. For example, the rendering instructions may include one or more instructions to present the additional visual content at a beginning of the progress length of the video content. Presentation of the additional visual content at the beginning of the progress length of the video content may include presentation of the additional content before the beginning of the video content playback (the additional content is presented before the playback of the video content begins) or presentation of the additional content at the beginning of the video content playback (the additional content is presented with the beginning of the video content playback).

The rendering instructions may include one or more instructions to present the additional visual content at an end of the progress length of the video content. Presentation of the additional visual content at the end of the progress length of the video content may include presentation of the additional content after the end of the video content playback (the additional content is presented after the playback of the video content concludes) or presentation of the additional content at the end of the video content playback (the additional content is presented with the ending of the video content playback, where the ending is defined in terms of numbers of video frames and/or playback time duration). Presentation of the additional visual content at other points in the progress length of the video content are contemplated.

Rendering instructions may define where in the image space of the video content (e.g., defined by presentation direction, presentation size) the additional visual content should be presented. For example, the rendering instructions may include one or more instructions to present the additional visual content at a presentation direction (e.g., defined in terms of deviation from the yaw axis 310, the pitch axis 320, the roll axis 330). In some implementations, the rendering instructions may include one or more instructions to present the additional visual content at a presentation extent (defining the size/scale of the additional visual content with respect to the visual content of the video content). In some implementations, the presentation of the additional visual content at a presentation direction/extent may be further defined by presentation rotation (defining rotation with respect to the visual content of the video content).

In some implementations, the rendering instructions may include one or more instructions to present the additional visual content based on a viewing window for the video content (e.g., spherical video content). The rendering instructions may provide for presentation of the additional visual content within the viewing window such that the additional visual content is displayed regardless of the location/size of the viewing window for the video content. The rendering instruction may provide for a specific placement of the additional visual content within the viewing window (e.g., placement at a certain portion within the viewing window, placement with a certain rotation within the viewing window).

In some implementations, the rendering instructions may further include one or more instructions to present the additional visual content based on the dimensions and/or the rotation of the viewing window. For example, based on the viewing window being rotated with respect to the video content, the additional visual content may be rotated so that the additional visual content appears upright within the viewing window, regardless of the orientation of the video content within the video content. In some implementations, the rendering instructions may further include one or more instructions to present the additional visual content based on the orientation of the video content. For example, the additional visual content may be presented to be aligned to the video content (top-down direction of the additional visual content is aligned to the top-down direction of the video content) regardless of the orientation of the viewing window with respect to the video content.

In some implementations, the rendering instructions may further include one or more instructions to present the additional visual content based on the user's eye position (e.g., user's gaze direction). For example, such instructions may provide for presentation of the additional visual content at/near the focus of the user's gaze. Such presentation of the additional visual content may increase the likelihood that the user will see the additional visual content during the playback of the video content.

The rendering instructions may include one or more parameters that define how the additional visual content should appear with respect to the video content, such as parameters relating to progress length, timing, playback speed, positioning of viewing window (e.g., location, rotation), positioning of virtual camera to view the video content (e.g., location, rotation), size of the additional visual content, scaling of the additional visual content (e.g., with respect to the video content), animation of the additional visual content, transition of the additional visual content (e.g., cross-fade, slide-in-and-out, movement within image space, such as spherical image space for spherical video content), color effects, layers, user's gaze direction, and/or other information relating to presentation of the additional visual content.

Rendering instructions may include one or more preset rendering instructions (e.g., rendering options selected by a user), one or more custom rendering instructions (e.g., rendering options customized by a user), and/or other rendering instructions. Present rendering instructions may include instructions which may be presented to a user for selection for inclusion in the rendering instructions. Custom rendering instructions may include instructions which may be generated based on user's selection of one or more options for generating the rendering instructions. For example, one or more user interfaces may provide options for a user to select one or more present rendering instructions to be used as rendering instructions or one or more options to generate rendering instructions.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate embedding content into videos. The machine readable instructions 100 may include one or more computer program components. The machine readable instructions 100 may include one or more of an video information component 102, an audio information component 104, an image-audio information component 106, a storage component 108, and/or other computer program components.

The video information component 102 may be configured to obtain video information defining one or more video content (e.g., spherical video content) and/or other information. Obtaining video information may include one or more of accessing, acquiring, analyzing, determining, examining, loading, locating, opening, receiving, retrieving, reviewing, storing, and/or otherwise obtaining the video information. The video information component 102 may obtain video information from one or more locations. For example, the video information component 102 may obtain video information from a storage location, such as the electronic storage 12, electronic storage of information and/or signals generated by one or more image sensors, electronic storage of a device accessible via a network, and/or other locations. The video information component 102 may obtain video information from one or more hardware components (e.g., an image sensor) and/or one or more software components (e.g., software running on a computing device).

The video information component 102 may be configured to obtain video information defining one or more video content during acquisition of the video content and/or after acquisition of the video content by one or more image sensors. For example, the video information component 102 may obtain video information defining a video while the video is being captured by one or more image sensors. The video information component 102 may obtain video information defining a video after the video has been captured and stored in memory (e.g., the electronic storage 12).

In some implementations, the video information may be obtained based on user interaction with a user interface/video application, and/or other information. For example, a user interface/video application may provide option(s) for a user to select one or more video content to be included in a container file. The video information defining the video content may be obtained based on the user's selection of the video content through the user interface/video application.

The visual information component 104 may be configured to obtain visual information defining one or more additional visual content presented with the video content and/or other information. Obtaining visual information may include one or more of accessing, acquiring, analyzing, determining, examining, loading, locating, opening, receiving, retrieving, reviewing, storing, and/or otherwise obtaining the visual information. The visual information component 104 may obtain visual information from one or more locations. For example, the visual information component 104 may obtain video information from a storage location, such as the electronic storage 12, electronic storage of information and/or signals generated by one or more image sensors, electronic storage of a device accessible via a network, and/or other locations. The visual information component 104 may obtain visual information from one or more hardware components (e.g., an image sensor) and/or one or more software components (e.g., software running on a computing device).

The visual information component 104 may be configured to obtain visual information defining additional visual content presented with the video content during acquisition of the additional visual content and/or after acquisition of the additional visual content by one or more image sensors. For example, the visual information component 104 may obtain visual information defining an image/video while the image/video is being captured by one or more image sensors. The visual information component 104 may obtain visual information defining an image/video after the image/video has been captured and stored in memory (e.g., the electronic storage 12).

In some implementations, the visual information may be obtained based on user interaction with a user interface/video application, and/or other information. For example, a user interface/video application may provide option(s) for a user to select one or more content as additional visual content for video content. The visual information defining the additional visual content may be obtained based on the user's selection of the additional visual content through the user interface/video application.

The rendering information component 106 may be configured to obtain rendering information and/or other information. Obtaining rendering information may include one or more of accessing, acquiring, analyzing, determining, examining, loading, locating, opening, receiving, retrieving, reviewing, storing, and/or otherwise obtaining the rendering information. The rendering information component 106 may obtain rendering information from one or more locations. For example, the rendering information component 106 may obtain video information from a storage location, such as the electronic storage 12, electronic storage of a device accessible via a network, and/or other locations. The rendering information component 106 may obtain rendering information from one or more hardware components and/or one or more software components (e.g., software running on a computing device).

In some implementations, the rendering information may be obtained based on user interaction with a user interface/video application, and/or other information. For example, a user interface/video application may provide option(s) for a user to select one or more rendering instructions for use with the video content. Selection of rendering instruction(s) may include selection of preset rendering instruction(s), custom rendering instruction(s), and/or other rendering instructions. The rendering instructions may be obtained based on the user's selection of the options provided through the user interface/video application.

The container component 108 may be configured to generate container information defining a container file and/or other information. The container information may include the video information, the visual information, the rendering instructions, and/or other information within a structure corresponding to a type of the container file. For example, based on the container file being of a given type, the video information, the visual information, the rendering instructions, and/or other information may be arranged within a given structure corresponding to the given type of the container file. In some implementations, the container file may be a single type (e.g., the container component 108 generates container information using the same structure) and the video information, the visual information, the rendering instructions, and/or other information may be arranged within a structure corresponding to the single type of the container file.

In some implementations, the visual information and the rendering information may be stored as metadata in the container file. The visual information and the rendering information may be stored separately from the video information in the metadata such that the video information, the visual information, and/or the rendering information may be accessed separately or together by a video application. For example, a video application providing playback of the video content using the contain file may be able to access the video information, the visual information, and/or the rendering information as needed to provide the presentation of the additional visual content within the video content. In some implementations, a video application providing playback of the video content using the container file may provide a user with the option to turn on/off the additional visual content—that is, the video application may allow the user to view the video content by itself or with the additional visual content.

In some implementations, the container information may include the video information and/or the visual information via inclusion of derivative video information and/or derivative visual information. Derivative video information may define derivative video content and derivative visual information may define derivative additional visual content. Derivative video/additional visual content may be characterized by lower fidelity than the video/additional visual content. Lower fidelity may include one or more of lower resolution, lower framerate, higher compression, and/or other lower fidelity. For example, the container component 108 may encode the video content and/or the additional visual content included in the container file to change one or more of resolution, framerate, and/or compression.

A playback of the video content using the container file may include a presentation of the additional visual content with the video content based on the rendering instructions. The additional visual content may be presented based on the rendering instructions such that the additional visual content is presented on top of the video content (presented as overlay over the visual content of the video content), the additional visual content is presented in place of one or more portions (in space or time) of the video content, the additional visual content is presented adjacent/next to (in space and/or time) the video content, and/or is otherwise presented with the video content.

Figure 6:
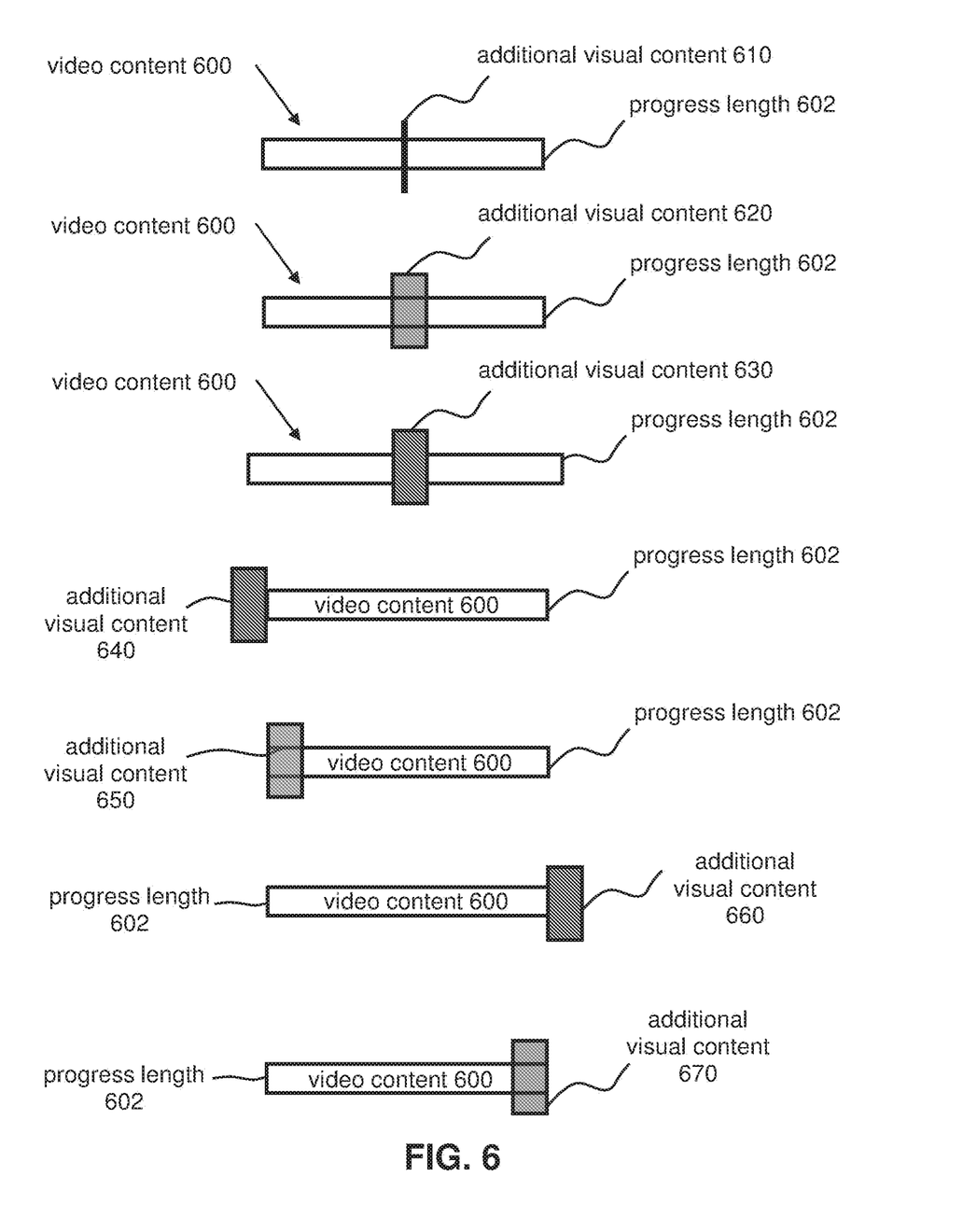
FIG. 6 illustrates example presentation of additional visual content with respect to video content in terms of time.

For example, FIG. 6 illustrates example presentation of the additional visual content 610, 620, 630, 640, 650, 660, 670 with respect to the video content 600 in terms of time (progress length of the video content) based on the rendering instructions. The video content 600 may have a progress length 602. The additional visual content 610 may be presented at a point within the progress length 602. The additional visual content 620 may be presented during a duration within the progress length 602 such that the presentation of the additional visual content 620 is overlaid on top of the video content 600 (e.g., the additional visual content 620 and the video content 600 are presented together). The additional visual content 630 may be presented for a duration within the progress length 602 such that the presentation of the additional visual content 620 occurs in between the presentation of the video content 600 (e.g., the additional visual content 630 is sandwiched between the video content 600). The additional visual content 640 may be presented before the video content 600 (e.g., the additional visual content 640 is presented as an intro for the video content 600). The additional visual content 650 may be presented during a duration at the beginning of the progress length 602 (e.g., the additional visual content 650 is overlaid on top of the beginning of the video content 600). The additional visual content 660 may be presented at the end of the video content 600 (e.g., the additional visual content 660 is presented as an outro for the video content 600). The additional visual content 670 may be presented during a duration at the end of the progress length 602 (e.g., the additional visual content 670 is overlaid on top of the ending of the video content 600). Other presentation of the additional visual content with respect to the video content in terms of time are contemplated.

Figure 7:
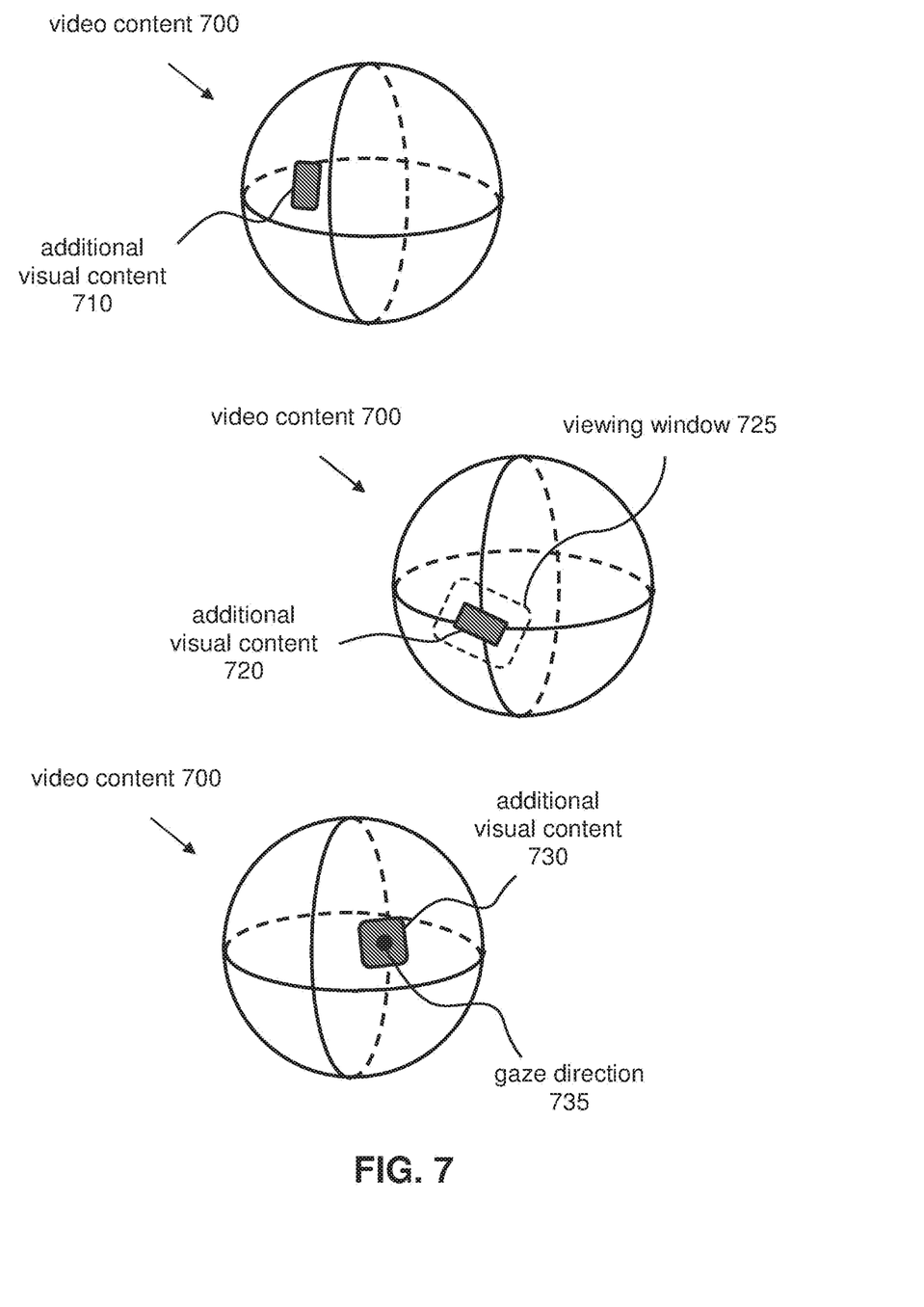
FIG. 7 illustrates example presentation of additional visual content with respect to video content in terms of space.

FIG. 7 illustrates example presentation of the additional visual content 710, 720, 730 with respect to the video content 700 in terms of space (location/rotation with respect to the image space of the video content). The video content 700 may include spherical video content. The additional visual content 710 may be presented at a particular presentation direction, a particular presentation extent, and/or a particular presentation rotation within the video content 700. The additional visual content 720 may be presented at a particular spatial location within the video content 700 based on a viewing window 725 for the video content 700 (e.g., position and/or rotation of the additional visual content 720 is determined based on which visual extent of the video content 700 is viewable/presented on a display). The additional visual content 730 may be presented at a particular spatial location within the video content 700 based on a gaze direction 735 of a user consuming the video content 700 (e.g., determined based on the user's eye position). Other presentation of the additional visual content with respect to the video content in terms of space are contemplated.

The storage component 110 may be configured to effectuate storage of the container information and/or other information in one or more storage media. For example, the storage component 110 may effectuate storage of the container information and/or other information in one or more locations including the video information, the visual information, and/or the rendering instructions, and/or other locations. For example, the video information/visual information may have been obtained from the electronic storage 12 and the container information may be stored in the electronic storage 12. In some implementations, the storage component 110 may effectuate storage of the container information in one or more remote locations (e.g., storage media located at/accessible through a server). In some implementations, the storage component 110 may effectuate storage of the container information through one or more intermediary devices. Other locations for and storage of the container information are contemplated.

While the description herein may be directed to image content, one or more other implementations of the system/method described herein may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 12, and the display 14 are shown to be connected to the interface 13 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 12 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10, or the electronic storage 12 may be provided integrally with one or more other components of the system 10 (e.g., the processor 11). Although the electronic storage 12 is shown in FIG. 1 as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

Figure 2:
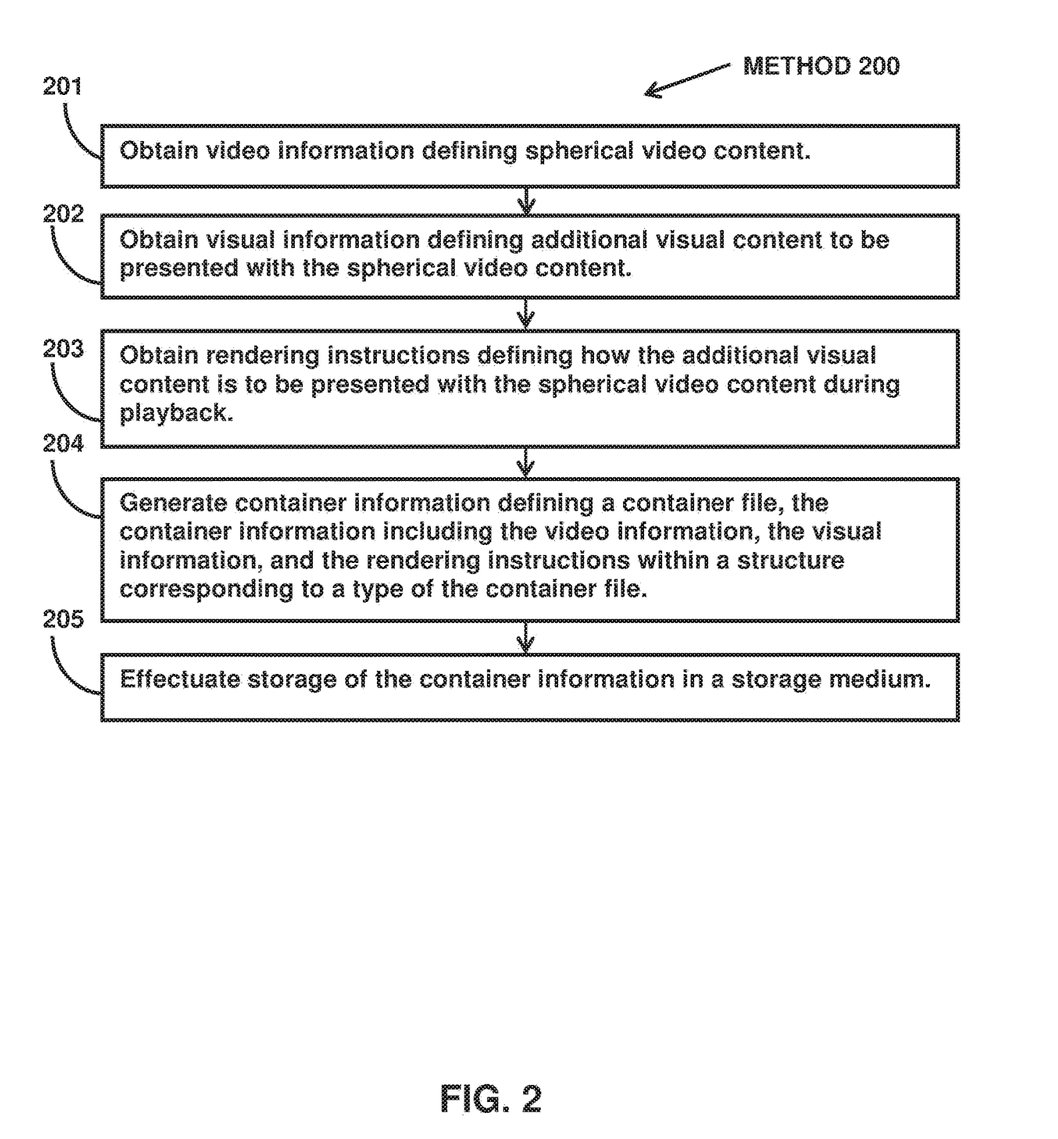
FIG. 2 illustrates a method for embedding content into videos.

FIG. 2 illustrates method 200 for embedding content into videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, image video defining spherical video content may be obtained. The spherical video content may have a progress length. The spherical video content may define visual content viewable from a point of view as a function of progress through the spherical video content. In some implementation, operation 201 may be performed by a processor component the same as or similar to the video information component 102 (Shown in FIG. 1 and described herein).

At operation 202, visual information defining additional visual content to be presented with the spherical video content may be obtained. In some implementations, operation 202 may be performed by a processor component the same as or similar to the visual information component 104 (Shown in FIG. 1 and described herein).

At operation 203, rendering instructions defining how the additional visual content is to be presented with the spherical video content during playback may be obtained. In some implementations, operation 203 may be performed by a processor component the same as or similar to the rendering instructions component 106 (Shown in FIG. 1 and described herein).

At operation 204, container information defining a container file may be generated. The container information may include the video information, the visual information, and the rendering instructions within a structure corresponding to a type of the container file. A playback of the spherical video content using the container file may include a presentation of the additional visual content with the spherical video content based on the rendering instructions. In some implementations, operation 204 may be performed by a processor component the same as or similar to the container component 108 (Shown in FIG. 1 and described herein).

At operation 205, the container information may be stored in a storage medium. In some implementations, operation 205 may be performed by a processor component the same as or similar to the storage component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that embeds content into videos, the system comprising:
    one or more physical processors configured by machine-readable instructions to:
        obtain video content, the video content having a progress length, the video content defining visual content as a function of progress through the video content;
        obtain additional visual content separate from the video content;
        obtain rendering instructions, the rendering instructions defining how the additional visual content is to be presented with the video content during playback;
        generate a container file, the container file including the video content, the additional visual content, and the rendering instructions, wherein the additional visual content and the rendering instructions are stored as metadata in the container file, further wherein a playback of the video content using the container file includes a presentation of the additional visual content with the video content based on the rendering instructions; and
        effectuate storage of the container file in a storage medium.

2. The system of claim 1, wherein the additional visual content includes dynamic visual content that changes with playback position.

3. The system of claim 1, wherein the additional visual content includes an image or a video.

4. The system of claim 1, wherein the additional visual content includes a bumper for the video content.

5. The system of claim 1, wherein the rendering instructions include an instruction to present the additional visual content at a beginning of the progress length.

6. The system of claim 1, wherein the rendering instructions include an instruction to present the additional visual content at an end of the progress length.

7. The system of claim 1, wherein the video content includes spherical video content defining the visual content from a point of view and the rendering instructions include a first instruction to present the additional visual content at a presentation direction, the presentation direction defined by deviation from a yaw axis, a pitch axis, and a roll axis of the spherical video content.

8. The system of claim 7, wherein the rendering instructions further include a second instruction to present the additional visual content at a presentation extent, the presentation extent defining size or scale of the additional visual content with respect to the visual content of the spherical video content.

9. The system of claim 1, wherein the video content includes spherical video content defining the visual content from a point of view and the rendering instructions include an instruction to present the additional visual content based on a viewing window for the spherical video content such that the additional visual content is presented within the viewing window and appears upright within the viewing window, the viewing window defining an extent of the visual content of the spherical video content presented during playback as the function of progress through the spherical video content.

10. The system of claim 1, wherein the video content includes spherical video content defining the visual content from a point of view and the rendering instructions include an instruction to present the additional visual content based on a viewing window for the spherical video content such that the additional visual content is presented within the viewing window, and top-down direction of the additional visual content is aligned to top-down direction of the visual content of the spherical video regardless of orientation of the viewing window, the viewing window defining an extent of the visual content of the spherical video content presented during playback as the function of progress through the spherical video content.

11. A method for embedding content into videos, the method performed by a computing system including one or more physical processors, the method comprising:
obtaining, by the computing system, video content, the video content having a progress length, the video content defining visual content viewable as a function of progress through the video content;
obtaining, by the computing system, additional visual content separate from the video content;
obtaining, by the computing system, rendering instructions, the rendering instructions defining how the additional visual content is to be presented with the video content during playback;
generating, by the computing system, a container file, the container information including the video content, the additional visual content, and the rendering instructions, wherein the additional visual content and the rendering instructions are stored as metadata in the container file, further wherein a playback of the video content using the container file includes a presentation of the additional visual content with the video content based on the rendering instructions; and
effectuating storage, by the computing system, of the container file in a storage medium.

12. The method of claim 11, wherein the additional visual content includes dynamic visual content that changes with playback position.

13. The method of claim 11, wherein the additional visual content includes an image or a video.

14. The method of claim 11, wherein the additional visual content includes a bumper for the video content.

15. The method of claim 11, wherein the rendering instructions include an instruction to present the additional visual content at a beginning of the progress length.

16. The method of claim 11, wherein the rendering instructions include an instruction to present the additional visual content at an end of the progress length.

17. The method of claim 11, wherein the video content includes spherical video content defining the visual content from a point of view and the rendering instructions include a first instruction to present the additional visual content at a presentation direction, the presentation direction defined by deviation from a yaw axis, a pitch axis, and a roll axis of the spherical video content.

18. The method of claim 17, wherein the rendering instructions further include a second instruction to present the additional visual content at a presentation extent the presentation extent defining size or scale of the additional visual content with respect to the visual content of the spherical video content.

19. The method of claim 11, wherein the video content includes spherical video content defining the visual content from a point of view and the rendering instructions include an instruction to present the additional visual content based on a viewing window for the spherical video content such that the additional visual content is presented within the viewing window and appears upright within the viewing window, the viewing window defining an extent of the visual content of the spherical video content presented during playback as the function of progress through the spherical video content.

20. The method of claim 11, wherein the video content includes spherical video content defining the visual content from a point of view and the rendering instructions include an instruction to present the additional visual content based on a viewing window for the spherical video content such that the additional visual content is presented within the viewing window, and top-down direction of the additional visual content is aligned to top-down direction of the visual content of the spherical video regardless of orientation of the viewing window, the viewing window defining an extent of the visual content of the spherical video content presented during playback as the function of progress through the spherical video content.

* * * * *